United States Patent Office 3,503,367
Patented Mar. 31, 1970

3,503,367
CEMENT APPLICATORS IN SHOE LAST MACHINES
Herbert Schindler, Pirmasens, Germany, assignor to Schon & Cie G.m.b.H., Pirmasens, Germany
Filed May 24, 1968, Ser. No. 731,767
Claims priority, application Germany, May 24, 1967, Sch 40,765
Int. Cl. B05c 11/00
U.S. Cl. 118—3          8 Claims

ABSTRACT OF THE DISCLOSURE

A die having feed elements for the application of cement on an insole in which passages for the cement to the feed elements are arranged to supply cement to respective groups of feed elements and a valve is contained in the passage feeding one particular group to close the flow of cement to such group.

CROSS-RELATED APPLICATION

This application relates to improvements of the invention disclosed in copending application Ser. No. 627,028, filed Mar. 30, 1967, and now abandoned owned by the common assignee.

DETAILED DESCRIPTION

The present invention relates to improvements in a device for the applying of a thermoplastic cement on the edge of a sole secured on the last of a cement lasting machine and in particular to a device of the character disclosed in U.S. patent application Ser. No. 627,028. The device includes a pressing die containing cement feeding elements having cement passages with outlet nozzles and spring loaded displaceable valves in the passages which open after the nozzles of the elements have been pressed against the insole.

In the known arrangement all the nozzles of the die bear on the insole during the application of the cement, so that no cement is lost, soiling the machine.

According to the present invention, the device can also be used for the application of cement on insoles whose circumferential line does not cover all the cement elements. This is particularly the case with insoles which are so narrow in the range of the camber that the cement applicators no longer bear on them. Though such cement elements are not contacted because they no longer bear on the narrow insoles, it must be avoided that cement can issue in an accidental opening, or that unused cement remains for any long period in the passages in front of the cement applicators. For example, it may be necessary to apply cement on the insole of a shoe with an open toe. In this case the last is able to project and bear against the valves when the die is applied. The cement would then flow to the lasts. This of course would be undesirable in the region of the open toe.

These disadvantages are avoided according to the invention by arranging in the passages through which the plastic cement is fed to the cement applicators at least one hand-operated shut-off valve for closing a branch duct for a selected group of cement applicators. A shut-off valve is preferably arranged in the region of the camber of the shoe to be effective on the applicators in the region of the camber to close the individual cement applicators thereat. A shut-off valve may also operate to close the cement applicators in the region of the toe.

Figure 2:
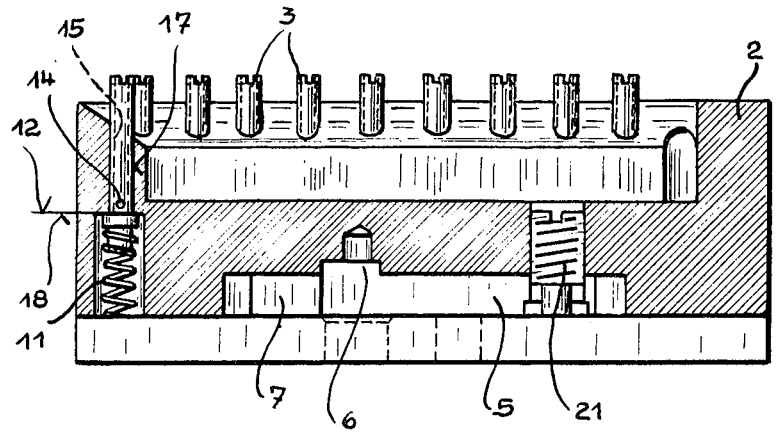
FIGURE 2 is a section along line A–B in FIG. 1.
Figure 1:
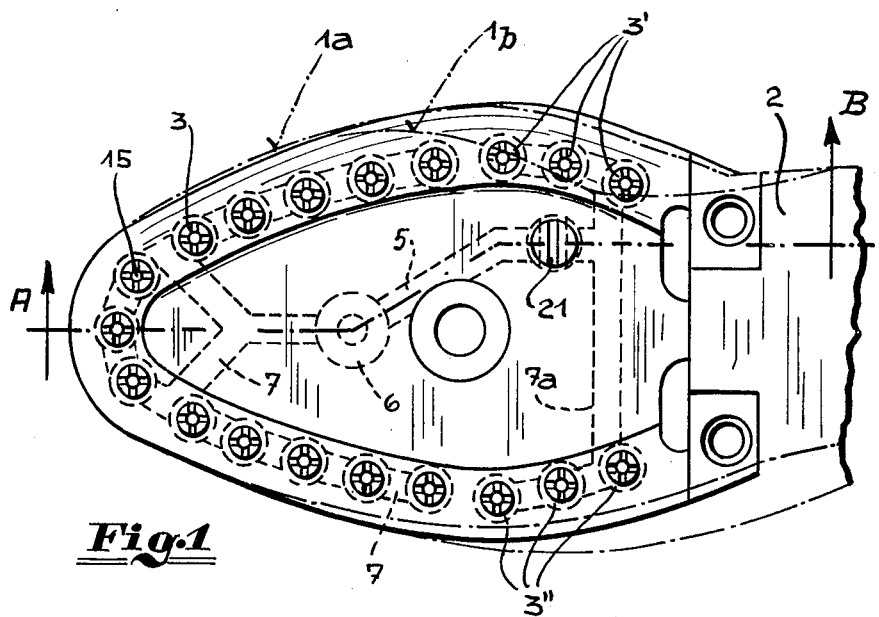
FIGURE 1 is a top plan view of the device according to the invention.

In FIG. 1 of the drawing are shown outlines of two insoles 1a and 1b in broken lines. These outlines differ substantially from each other in the region of the camber. The difference is so great that two groups 3′ and 3″ of cement applicators, which are arranged in the region of the camber of the smaller insole, must be closed when the other cement applicators are opened and deposit cement on the insoles. This is to insure against any possible accidental leakage through groups 3′ and 3″. The cement is fed through ducts 5 and 7 (over relief valve 6) to the various cement applicators, the ducts being so arranged that a branch duct 7a leading to the two isolated groups 3′ and 3″ of cement applicators can be shut off by hand by a valve 21. For the application of cement on an insole with the contour 1a, the hand-operated valve 21 is opened. Cement then flows through the branch duct 7a so that all cement applicators 3, 3′, 3″ are supplied with cement.

When the die is pressed against the insole carried by a last, feed ducts 15, which extend centrally in the cement applicators 3, open when the valve faces 12 are lifted from the valve seats 18 against the action of springs 11. The cement can then flow through the bores 14 into the feed ducts 15 and issue therefrom at the opposite end to arrive on the insole. The applicators 3 are slidable in bores 17 and are urged to closed position by the springs 11.

If the valve 21 closes the branch duct 7a and the cement applicators 3′ and 3″ are accidentally pressed down, no cement can issue because they have been shut off from the supply.

From the above, therefore, it is seen that the invention provides for separate supply of cement to respective groups of feed elements 3, or 3′ and 3″ via respective feed passages 7, 7a and wherein valve 21 in passage 7a is operative to selectively interrupt the flow of cement to elements 3′ and 3″.

Although the valve 21 has been shown in operation with feed elements in the region of the camber for wide and narrow insoles, it is obvious that a separate valve may be provided in replacement of valve 21 or in combination therewith for controlling the feed of cement to feed elements in the region of the toe. Thereby, in cases of cementing insoles with an open toe, the feed elements in the region of the toe can be isolated from the cement feed.

What is claimed is:
1. In a lasting machine in which cement is applied on the edge of an insole on the last, the provision of a die having feed elements with cement passages containing spring loaded valves therein which are opened by contact of the feed elements with the sole, an improvement wherein said feed elements are arranged in a plurality of groups, and an equal plurality of feed passages are provided which supply respective groups of feed elements with cement, and valve means in at least one of said feed passages for interrupting the flow of cement to the group of feed elements associated therewith.

2. An improvement as claimed in claim 1, wherein said valve means is a manually controlled valve.

3. An improvement as claimed in claim 2, wherein said groups are two in number, one being in the region of the toe of the last, the other being in the region of the camber of the last, the latter being connected to the feed passage containing the valve means.

4. An improvement as claimed in claim 3, wherein said manually controlled valve is located in the region of said camber.

5. An improvement as claimed in claim 1, wherein said feed passages include main feed passages, and branch passages leading from the main feed passages to the respective groups of feed elements.

6. An improvement as claimed in claim 5, wherein said valve means is located in the main feed passage upstream of the branch passage leading to that group of feed elements to which the flow of cement is to be interrupted.

7. An improvement as claimed in claim 6, wherein said valve means is a manually controlled valve.

8. An improvement as claimed in claim 7 comprising a check valve in the supply to the main feed passages.

References Cited

UNITED STATES PATENTS

| | | | |
|---|---|---|---|
| 2,794,415 | 6/1957 | Hillman | 118—3 |
| 3,183,887 | 5/1965 | Derderian | 118—3 |
| 3,271,800 | 9/1966 | Allard | 118—3 X |

WALTER A. SCHEEL, Primary Examiner

J. P. McINTOSH, Assistant Examiner